United States Patent
Hong et al.

(10) Patent No.: US 10,246,524 B2
(45) Date of Patent: Apr. 2, 2019

(54) METHOD FOR PREPARING SULFOBUTYL ETHER-β-CYCLODEXTRIN

(71) Applicants: ASYMCHEM LABORATORIES (TIANJIN) CO., LTD, Tainjin (CN); ASYMCHEM LIFE SCIENCE (TIANJIN) CO., LTD, Tianjin (CN); TIANJIN ASYMCHEM PHARMACEUTICAL CO., LTD., Tianjin (CN); ASYMCHEM LABORATORIES (FUXIN) CO., LTD, Liaoning (CN); JILIN ASYMCHEM LABORATORIES CO., LTD., Jilin (CN)

(72) Inventors: Hao Hong, Tianjin (CN); Changfeng Li, Tianjin (CN); Litao Shen, Tianjin (CN)

(73) Assignee: ASYMCHEM LABORATORIES (TIANJIN) CO., LTD., Tianjin (CN)

(*) Notice: Subject to any disclaimer, the term of this patent is extended or adjusted under 35 U.S.C. 154(b) by 178 days.

(21) Appl. No.: 15/108,495

(22) PCT Filed: Oct. 14, 2014

(86) PCT No.: PCT/CN2014/088579
§ 371 (c)(1),
(2) Date: Jun. 27, 2016

(87) PCT Pub. No.: WO2015/103895
PCT Pub. Date: Jul. 16, 2015

(65) Prior Publication Data
US 2016/0326270 A1 Nov. 10, 2016

(30) Foreign Application Priority Data
Jan. 10, 2014 (CN) .......................... 2014 1 0012162

(51) Int. Cl.
*C08B 37/16* (2006.01)
*C08L 5/16* (2006.01)

(52) U.S. Cl.
CPC ............ *C08B 37/0012* (2013.01); *C08L 5/16* (2013.01)

(58) Field of Classification Search
CPC ............................... C08B 37/0012; C08L 5/16
USPC .............................................. 514/58; 536/103
See application file for complete search history.

(56) References Cited

U.S. PATENT DOCUMENTS

| | | | |
|---|---|---|---|
| 5,134,127 A | 7/1992 | Stella et al. | |
| 6,153,746 A | 11/2000 | Shah et al. | |
| 7,635,773 B2 | 12/2009 | Antle | |
| 2009/0270348 A1* | 10/2009 | Antle | ................... A61K 31/724 514/58 |
| 2016/0009826 A1* | 1/2016 | Antle | ................... C08B 37/0012 536/103 |

FOREIGN PATENT DOCUMENTS

| | | |
|---|---|---|
| CN | 1858071 A | 8/2006 |
| CN | 101314045 A | 12/2008 |
| CN | 101519460 A | 9/2009 |
| CN | 101959508 A | 1/2011 |
| CN | 102382210 A | 3/2012 |
| CN | 102921018 A | 2/2013 |
| CN | 103694376 A | 4/2014 |
| JP | H0387193 A | 4/1991 |
| WO | 2013123254 A1 | 8/2013 |
| WO | 2013130666 A1 | 9/2013 |

OTHER PUBLICATIONS

PCT International Search Report for PCT Patent Application No. PCT/CN2014/088579 dated Jan. 15, 2015.

* cited by examiner

*Primary Examiner* — Yih-Horng Shiao
(74) *Attorney, Agent, or Firm* — McAndrews, Held & Malloy, Ltd.

(57) ABSTRACT

A method for preparing sulfobutyl ether-β-cyclodextrin. β-cyclodextrin and 1,4-sulfobutyrolactone are used as raw materials, and a proper amount of an organic solvent is introduced into an alkaline aqueous solution, so that the solubility of the 1,4-sulfobutyrolactone is increased, and the synthesis yield of the sulfobutyl ether-β-cyclodextrin is improved. Operations including ultrasonic dialysis, active carbon decoloration, freeze-drying and so on are performed on the obtained product solution, so as to obtain a powder product of the sulfobutyl ether-beta-cyclodextrin.

17 Claims, 1 Drawing Sheet

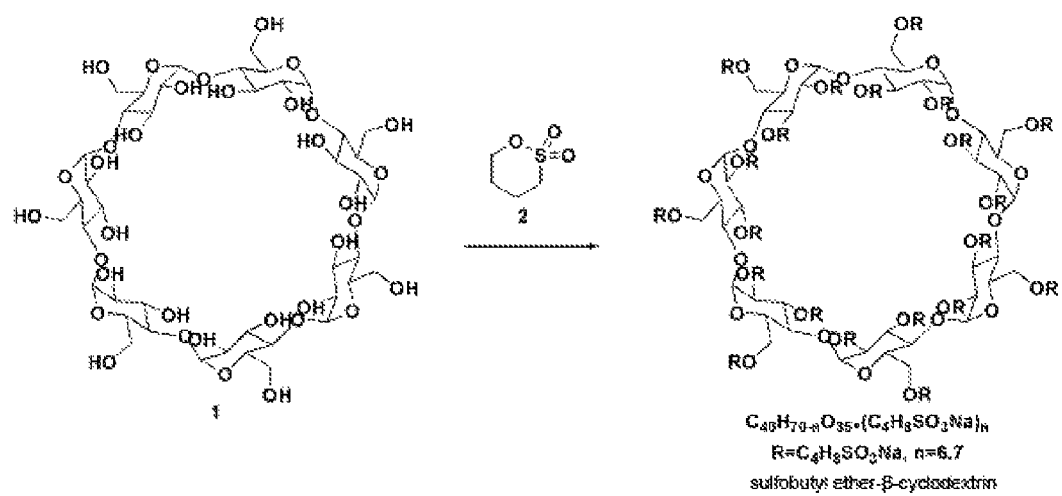

METHOD FOR PREPARING SULFOBUTYL ETHER-β-CYCLODEXTRIN

CROSS-REFERENCE TO RELATED APPLICATIONS/INCORPORATED BY REFERENCE

This application is a 371 of International Patent Application No. PCT/CN2014/088579 filed Oct. 14, 2014, entitled "METHOD FOR PREPARING SULBUTYL ETHER-B-CYCLODEXTRIN", which claims priority to Chinese Patent Application No. 201410012162.7 filed Jan. 10, 2014, entitled "METHOD FOR PREPARING SULBUTYL ETHER-B-CYCLODEXTRIN". The above-identified applications are hereby incorporated herein by reference in their entirety.

TECHNICAL FIELD

The present disclosure relates to the field of organic synthesis of pharmaceutical auxiliary materials, particularly to a method for preparing sulfobutyl ether-β-cyclodextrin.

BACKGROUND

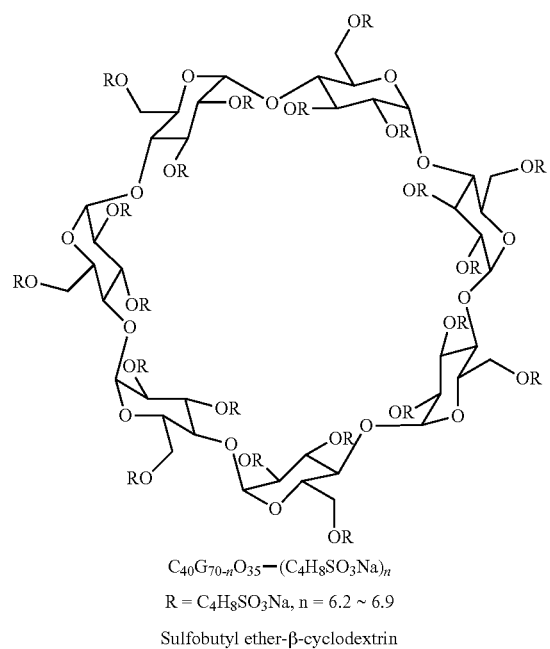

$C_{40}G_{70-n}O_{35}$—$(C_4H_8SO_3Na)_n$

R = $C_4H_8SO_3Na$, n = 6.2 ~ 6.9

Sulfobutyl ether-β-cyclodextrin

Sulfobutyl ether-β-cyclodextrin, referred to hereafter as SBE-β-CD, is a sulfobutyl derivative of anionic cyclodextrin having high water solubility, and which is used as a novel pharmaceutical preparation auxiliary material. The SBE-β-CD can form noncovalent inclusion complexes with pharmaceutical molecules which improves the stability, water solubility, safety, and the biological activity of the therapeutic agents. The SBE-β-CD has little nephrotoxicity, can alleviate hemolysis, and modulate the rate of release of a medicine. At present, the SBE-β-CD has become commercialized and applied in injections, oral medicines, nasal preparations, ophthalmic drugs, and so on, and has special affinity toward forming inclusion complexes with nitrogen-containing medicines.

Since the SBE-β-CD is synthesized in a single method, a key of synthesis of the SBE-β-CD is to improve the yield thereof and find a method applicable to mass production.

Existing methods for synthesizing the SBE-β-CD involve subjecting hydroxyl groups on carbons of sites 2, 3, 6 of a β-cyclodextrin glucose unit to a substitution reaction using sulfobutyrolactone in an alkaline aqueous solution or by subjecting a β-cyclodextrin to hydroxyl group deprotonation with sodium in an organic solvent followed by sulfobutyrolactone substitution reaction.

As disclosed in U.S. Pat. No. 5,134,127, the SBE-β-CD is firstly synthesized by subjecting β-cyclodextrin and the 1,4-sulfobutyrolactone to a reaction in a sodium hydroxide aqueous solution, deionization, ultrafiltration, and freeze-drying are performed to obtain a pure product of the SBE-β-CD having a substitution degree of 7.0 to 7.1. Later, U.S. Pat. No. 6,153,746 makes improvements with reference to this method to obtain a series of the SBE-β-CD having different degrees of substitution through synthesis and separation. the SBE-β-CD is subjected to amplified synthesis, dialysis, ultrafiltration, active carbon decolourization, and precise filtering. The product aqueous solution is freeze dried to obtain SBE-β-CD having a substitution degree of 6.5. U.S. Pat. No. 7,635,773 uses the same reagents to carry out industrial production of the SBE-β-CD, after dialysis, active carbon decolourization, and precise filtering are performed, a product aqueous solution is subjected to spray drying to obtain the SBE-β-CD having a substitution degree of 6.6. However, isolated yields of the SBE-β-CD synthesized in this series of reports are between 60% and 70%.

In Chinese patent CN1858071A, after hydroxyl deprotonation by sodium metal in a 1,4-dioxane, a β-cyclodextrin is subjected to substitution reaction with a 1,4-sulfobutyrolactone. Filtering and washed with methanol is performed after the reaction to obtain a crude product. Desalting and purification of an aqueous solution of the crude product are performed using a glucose gel column (G-25), and the solution is concentrated and freeze dried to obtain a SBE-β-CD product. The method has a shortcoming that dangerous metal sodium is used as a reagent, the expensive glucose gel column is used in the purification, and the obtained SBE-β-CD product has a moderate yield of 49% to 51%.

Therefore, it is urgent to find a practical and feasible synthesis route which is simple in process, low in cost, high in yield, easy to operate and applicable to mass production so as to solve the problem existing in the prior art.

SUMMARY

The present disclosure aims to provide a method for preparing the SBE-β-CD (see FIG. 1). The method overcomes the shortcoming of the prior art. A β-cyclodextrin (compound 1) and an 1,4-sulfobutyrolactone (compound 2) are used as raw materials, and a proper amount of an organic solvent is introduced into an alkaline aqueous solution, so that the solubility of the 1,4-sulfobutyrolactone is increased, and the synthesis yield of the SBE-β-CD is improved. Operations including ultrasonic dialysis, active carbon decolourization, freeze-drying and so on, are performed on an obtained product solution so as to obtain a powder product of the SBE-β-CD. The method represents a stable process with moderate reaction condition that provides good selectivity and having simple post-reaction treatment operations. The obtained product has very high purity and yield, thereby providing a new idea and method for mass production of SBE-β-CD.

A technical description of the present disclosure is: a method for preparing the SBE-β-CD, characterized by the following specific preparation steps:

Step (1): synthesis reaction: controlling the temperature at 20° C. to 30° C.; adding an organic solvent and a sodium hydroxide aqueous solution having a concentration of 3.7 N into a reaction flask; increasing the temperature to 60° C. to 70° C., adding a β-cyclodextrin (compound 1) into the reaction flask, dropping 1,4-sulfobutyrolactone (compound 2) to the system at 70° C. to 75° C., stirring the system at 70° C. to 75° C. after the dropping, controlling the system at pH>9 by using a sodium hydroxide aqueous solution having a concentration of 3.7 N; reducing the temperature to 20° C. to 25° C. when β-cyclodextrin accounts for less than 0.5% wt of the total input of the β-cyclodextrin as judged by High Performance Liquid Chromatography (HPLC); and adjusting the pH of the system to 7.0 to 7.5 using a concentrated hydrochloric acid. The obtained reaction mixture is used directly in the next purification operation step;

Step (2): purification: controlling the temperature at 20° C. to 30° C., adding the mixed reaction solution obtained in Step (1) into a dialysis bag, performing ultrasonic dialysis until it is detected that the content of chloride ions is less than 10 ppm; processing an obtained dialysate by an active carbon, detecting a product until ultraviolet absorption is less than 0.5 AU, washing the active carbon twice by using deionized water having a volume ratio of 1 to 2 Vol/g to the raw material β-cyclodextrin, performing an operation of the next step after a washing solution is combined with a filtrate, filtering a combined filtrate by a 0.65 to 0.22 μm precise filter, then performing concentration until the percent content of the SBE-β-CD accounts for 30 wt % to 35 wt % of the total amount of the solution. Freeze-drying is performed to obtain SBE-β-CD. The average degree of substitution of SBE-β-CD is 6.7 as judged by capillary electrophoresis.

The β-cyclodextrin in Step (1) is a product prepared by crystallizing a commercial β-cyclodextrin in hot water at 90° C. to 100° C. for 2 to 3 times.

The organic solvent in Step (1) is at least one of a tetrahydrofuran, an 1,4-dioxane or a 2-methyltetrahydrofuran.

In Step (1), the ratio of the amount use of the organic solvent to that of the β-cyclodextrin is 0.02 to 0.20 ml/g; the ratio of the use amount of the sodium hydroxide in the sodium hydroxide aqueous solution to that of the β-cyclodextrin is 7.0 molar equivalents, the ratio of the use amount of the 1,4-sulfobutyrolactone to that of the β-cyclodextrin is 8.0 molar equivalents, and the ratio of the use amount of the sodium hydroxide in the sodium hydroxide aqueous solution used for regulating the pH value of the system to that of the β-cyclodextrin is 3.5 molar equivalents.

In Step (2), the molecular weight cut-off of the dialysis bag is 1000, the ratio of the use amount of the active carbon to that of the β-cyclodextrin is 0.05 to 0.2 g/g, and the ratio of the use amount of the deionized water for washing the active carbon to that of the β-cyclodextrin is 1 to 2 ml/g.

In Step (2), processing the product by the active carbon again if an ultraviolet absorption value of the product processed by the active carbon is still larger than or equal to 0.5 AU.

A method for preparing a SBE-β-CD is provided according to another aspect of the present disclosure. The method includes: mixing an ether solvent with a sodium hydroxide aqueous solution to form a first mixed solution; heating the first mixed solution to 60° C. to 70° C. and then mixing with a β-cyclodextrin to form a second mixed solution; heating the second mixed solution to 70° C. to 75° C. and then mix with an 1,4-sulfobutyrolactone to form a reaction system; stirring the reaction system at 70° C. to 75° C. and controlling the pH value of the reaction system to be larger than 9; cooling the reaction system to 20° C. to 25° C. when the percentage of the surplus of the β-cyclodextrin accounts for less than 0.5% wt of the input of the β-cyclodextrin, regulating the pH value of the reaction system at 7.0 to 7.5 to obtain a product system containing the SBE-β-CD; and purifying the product system to obtain the SBE-β-CD.

Further, the concentration of the sodium hydroxide aqueous solution is 3.7 N; the method applies the sodium hydroxide aqueous solution having a concentration of 3.7 N to control the pH value of the reaction system to be larger than 9; the method applies a concentrated hydrochloric acid to regulate the pH value of the reaction system at 7.0 to 7.5.

Further, the ratio of the use amount of the ether solvent to that of the β-cyclodextrin is 0.02 to 0.20 ml/g; the ratio of the molar equivalents of the sodium hydroxide in the sodium hydroxide aqueous solution in the first mixed solution to those of the β-cyclodextrin is 6.0 to 8.0, preferably 7.0; the ratio of the molar equivalents of the 1,4-sulfobutyrolactone to those of the β-cyclodextrin is 7.0 to 9.0, preferably 8.0; the ratio of the molar equivalents of the sodium hydroxide in the sodium hydroxide aqueous solution used for controlling the pH value of the reaction system to those of the β-cyclodextrin is 3.0 to 4.0, preferably 3.5.

Further, the β-cyclodextrin is a product prepared by crystallizing a commercial β-cyclodextrin in hot water at 90° C. to 100° C. for 1 to 3 times.

Further, the ether solvent is one or more in a group consisting of a tetrahydrofuran, an 1,4-dioxane or a 2-methyltetrahydrofuran.

Further, the process of purifying the product system includes: subjecting the product system to dialysis at 20° C. to 30° C. until the content of chloride ions in the product system is less than 10 ppm and obtaining a first purified system; processing the first purified system with an active carbon and obtaining a second purified system; filtering and concentrating the second purified system until the content of the SBE-β-CD accounts for 30 wt % to 35 wt % of the total weight of the second purified system and obtaining a third purified system; freeze-drying the third purified system to obtain the SBE-β-CD.

Further, the purification process applies a dialysis bag having a molecular weight cut-off of 1000 to perform the dialysis.

Further, the process of processing the first purified system with the active carbon includes: mixing the active carbon with the first purified system and then filtering and obtaining adsorption active carbon and a filtrate; washing the adsorption active carbon and obtaining a washing solution; combining the washing solution with the filtrate and obtaining the second purified system.

Further, the ratio of the use amount of the active carbon to that of the β-cyclodextrin in the purification process is 0.05 to 0.2 g/g; the adsorption active carbon is washed by using deionized water and the ratio of the deionized water to the β-cyclodextrin is 1 to 2 ml/g.

Further, the process of processing the first purified system with the active carbon may be performed repeatedly until ultraviolet absorption of a product recovered from the filtrate is less than 0.5 AU.

Further, the purification process uses a precise filter having a filter element precision of 0.65 to 0.22 μm to filter and concentrate the second purified system.

The present disclosure has the following advantages: 1. The β-cyclodextrin and the 1,4-sulfobutyrolactone are used as raw materials and a proper amount of the organic solvent is introduced into the alkaline aqueous solution so that the solubility of the 1,4-sulfobutyrolactone is increased, and the synthesis yield of SBE-β-CD is largely improved. 2. The method represents a stable process with moderate reaction condition that provides good selectivity and having simple post-reaction treatment operations. The obtained product has a high yield of 75% to 80%, thus the method is applicable to the demands of industrial production.

BRIEF DESCRIPTION OF THE DRAWINGS

The accompanying drawings of the specification, which constitute a part of the application, are used for providing further understanding to the present disclosure. The exemplary embodiments of the present disclosure and illustration thereof are used for explaining the present disclosure, instead of constituting improper limitation to the present disclosure. In the accompanying drawings:

FIG. 1 shows a diagram of processes of chemical reactions of a method for preparing sulfobutyl ether-β-cyclodextrin (SBE-β-CD) involved in the present disclosure.

DETAILED DESCRIPTION OF THE EMBODIMENTS

It needs to be noted that the embodiments in the application and the characteristics in the embodiments may be combined with each other if there is no conflict. The present disclosure will be expounded hereinafter with reference to the accompanying drawings and in conjunction with the embodiments.

A method for preparing the SBE-β-CD is provided in a typical embodiment of the present disclosure. The method includes: mixing an ether solvent with a sodium hydroxide aqueous solution to form a first mixed solution; heating the first mixed solution to 60° C. to 70° C. and then mixing with a β-cyclodextrin to form a second mixed solution; heating the second mixed solution to 70° C. to 75° C. and then mixing with an 1,4-sulfobutyrolactone to form a reaction system; stirring the reaction system at 70° C. to 75° C. and controlling the pH value of the reaction system to be larger than 9; cooling the reaction system to 20° C. to 25° C. when the percentage of the surplus of the β-cyclodextrin accounts for less than 0.5% wt of the input of the β-cyclodextrin; regulating the pH value of the reaction system at 7.0 to 7.5 and obtaining a product system containing SBE-β-CD; and purifying the product system to obtain the SBE-β-CD.

The method employs the β-cyclodextrin and the 1,4-sulfobutyrolactone as raw materials, and a proper amount of the ether solvent is introduced into the sodium hydroxide aqueous solution so that the solubility of the 1,4-sulfobutyrolactone is increased. The contact between the 1,4-sulfobutyrolactone and the β-cyclodextrin is increased. The synthesis yield of the SBE-β-CD is largely improved, and the degree of substitution of the product can be controlled within an ideal range. In addition, the ether solvent is applied to replace some of the sodium hydroxide aqueous solution, thereby reducing the content of a strongly alkaline substance in the sodium hydroxide aqueous solution in the reaction system, largely reducing production of byproducts, and improving the yield of the SBE-β-CD. In the meanwhile, the method represents a stable process with a moderate reaction condition, having simple post-reaction treatment operations, and is easy to operate, and the obtained product has a high yield, thus the method is applicable to demands of industrial production.

In a preferred embodiment of the present disclosure, the concentration of the sodium hydroxide aqueous solution is 3.7 N. The method applies the sodium hydroxide aqueous solution having a concentration of 3.7 N to control the pH value of the reaction system to be larger than 9, and the pH value is preferably 9 to 10. Further, the method applies a concentrated hydrochloric acid to regulate the pH value of the reaction system at 7.0 to 7.5. The concentrated hydrochloric acid is easily separated from an organic matter in the product system in the subsequent purification processing, thereby improving the yield of the SBE-β-CD.

To control the substation degree of the product between 6.2 and 6.9, the ratio of the use amount of the ether solvent to that of the β-cyclodextrin is preferably 0.02 to 0.20 ml/g; the ratio of the molar equivalents of the sodium hydroxide in the sodium hydroxide aqueous solution in the first mixed solution to those of the β-cyclodextrin is 6.0 to 8.0, preferably 7.0; the ratio of the molar equivalents of the 1,4-sulfobutyrolactone to those of the β-cyclodextrin is 7.0 to 9.0, preferably 8.0; the ratio of the molar equivalents of the sodium hydroxide in the sodium hydroxide aqueous solution used for controlling the pH value of the reaction system to those of the β-cyclodextrin is 3.0 to 4.0, preferably 3.5.

To prevent the yield of the SBE-β-CD from being affected by elevated impurities in the raw materials as much as possible, preferably, the β-cyclodextrin is a product prepared by crystallizing a commercial β-cyclodextrin in hot water at 90° C. to 100° C. for 1 to 3 times so as, and the purity of the β-cyclodextrin is further improved by using the crystallizing method.

The ether solvent is used for increasing the solubility of the 1,4-sulfobutyrolactone. Thus all ether solvents with a high solubility to the 1,4-sulfobutyrolactone may be considered in the application. After comparing the application effect of various ether solvents in the technical solution of the present disclosure, the inventors of the application believe that the ether solvent is preferably one or more of a group consisting of a tetrahydrofuran, an 1,4-dioxane or a 2-methyltetrahydrofuran.

After the product system containing the SBE-β-CD is obtained by applying the method above, the SBE-β-CD in the product system may be purified with reference to an existing purification method. In order to further ensure that the SBE-β-CD in the product system is extracted as much as possible in the present disclosure, the process of purifying the product system preferably includes: subjecting the product system to dialysis at 20° C. to 30° C. until the content of chloride ions in the product system is less than 10 ppm and obtaining a first purified system; processing the first purified system with an active carbon to remove possible unknown impurities derived from the β-cyclodextrin or the product SBE-β-CD and obtaining a second purified system; filtering and concentrating the second purified system until the content of the SBE-β-CD accounts for 30 wt % to 35 wt % of the total weight of the second purified system and obtaining a third purified system; freeze-drying the third purified system and obtaining the SBE-β-CD. Byproducts and impurities and so on can be fully separated with the SBE-β-CD after the product system is purified, thereby improving the yield of the SBE-β-CD.

In another preferred embodiment, the purification process applies a dialysis bag having a molecular weight cut-off of 1000 to perform the dialysis, thereby separating a macromolecular substance from the product system.

In the purification process, the process of processing the first purified system with the active carbon includes: mixing the active carbon with the first purified system and then filtering and obtaining adsorption active carbon and a filtrate; washing the adsorption active carbon and obtaining a washing solution; combining the washing solution with the filtrate and obtaining the second purified system. The active carbon and the first purified system are mixed to absorb an unreacted raw material and the impurities in the first purified system by using the active carbon, and the process may be repeated until ultraviolet absorption of a product recovered from the filtrate is less than 0.5 AU, so as to improve the purity of a final product.

Preferably, the ratio of the use amount of the active carbon to that of the β-cyclodextrin is 0.05 to 0.2 g/g so as to improve the absorption effect of the active carbon in the purification process, and preferably, the adsorption active carbon is washed by using deionized water and the ratio of the deionized water to the β-cyclodextrin is 1 to 2 ml/g, so as to separate residual the SBE-β-CD in the active carbon as much as possible.

Preferably, the application applies a precise filter having a filter element precision of 0.65 to 0.22 μm to filter and concentrate the second purified system, so as to control the content of extraneous mater impurities from the granular size.

The preparation method of the present disclosure will be verified in the following embodiments so as to fully explain the essence, the preparation idea and concept of the present disclosure. These embodiments are only illustrative and represent particular cases, but should not be explained or understood as limitation to protection of the present disclosure.

Embodiment 1: A method for preparing sulfobutyl ether-β-cyclodextrin (SBE-β-CD), characterized in that specific preparation steps are as follows.

Step (1): Synthesis reaction: the temperature was controlled at 20° C. to 30° C., an 1,4-dioxane (0.4 ml) and a sodium hydroxide aqueous solution (3.7 N, 123.3 mmol) were added to a reaction flask. The temperature was increased to 60° C. to 70° C., α β-Cyclodextrin (20 g, 17.6 mmol) was added into the reaction flask, and an 1,4-sulfobutyrolactone (19.2 g, 141.0 mmol) was dropped to the system at 70° C. to 75° C. The system was stirred at 70° C. to 75° C. after the dropping, and the pH value of the system was evidently reduced within 1 hour and was controlled at pH>9 by adding sodium hydroxide aqueous solution (3.7 N, 61.7 mmol in total). When the surplus of the β-cyclodextrin was less than 0.5% wt as judged by HPLC, the temperature was reduced to 20° C. to 25° C., then the system was regulated to pH=7.0 to 7.5 by adding a concentrated hydrochloric acid. The obtained reaction mixture was used directly in the next purification operation step.

Step (2): Purification process: the temperature was controlled at 20° C. to 30° C. The obtained reaction treatment solution was added into a dialysis bag, and ultrasonic dialysis was performed until it was detected that the content of chloride ions was less than 10 ppm. The obtained dialysate was treated with an active carbon (1 g) until the product solution was less than 0.5 AU by ultraviolet absorption (the operation was repeated once if the ultraviolet absorption was beyond this range). The active carbon was washed twice with 20 ml of deionized water, and, an operation of the next step was performed after a washing solution was combined with a filtrate. The combined filtrate was filtered through a 0.65 to 0.22 μm precise filter, then concentration was performed until it was detected that the content of the SBE-β-CD is 30 wt % to 35 wt %, freeze-drying was performed to obtain 30.5 g of the SBE-β-CD. The yield was 80%, and the average degree of substitution of the SBE-β-CD was 6.7 as judged by capillary electrophoresis.

Embodiment 2: A method for preparing sulfobutyl ether-β-cyclodextrin (SBE-β-CD), characterized in that specific preparation steps are as follows.

Step (1): Synthesis reaction: the temperature was controlled at 20° C. to 30° C., a tetrahydrofuran (1.0 ml) and a sodium hydroxide aqueous solution (3.7 N, 61.7 mmol) were added to a reaction flask, the temperature was increased to 60° C. to 70° C., a β-cyclodextrin (10 g, 8.8 mmol) was added into the reaction flask, an 1,4-sulfobutyrolactone (9.6 g, 70.5 mmol) was dropped to the system at 70° C. to 75° C. The system was stirred at 70° C. to 75° C. after the dropping, and the pH value of the system was evidently reduced within 1 hour and was controlled at pH>9 by adding sodium hydroxide aqueous solution (3.7 N, 30.9 mmol in total). When the surplus of the β-cyclodextrin was less than 0.5% wt as judged by HPLC, the temperature was reduced to 20° C. to 25° C., then the system was regulated to pH=7.0 to 7.5 by adding a concentrated hydrochloric acid solution. The obtained reaction mixture was used directly in the next purification operation step.

Step (2): Purification process: the temperature was controlled at 20° C. to 30° C. The obtained reaction treatment solution was added into a dialysis bag, and ultrasonic dialysis was performed until it was detected that the content of chloride ions was less than 10 ppm. The obtained dialysate was treated with an active carbon (1 g) until the product solution was less than 0.5 AU by ultraviolet absorption (the operation was repeated once if the ultraviolet absorption was beyond this range). The active carbon was washed twice with 15 ml of deionized water, an operation of the next step was performed after a washing solution was combined with a filtrate. The combined filtrate was filtered through a 0.65 to 0.22 μm precise filter, then concentration was performed until it was detected that the content of the SBE-β-CD is 30 wt % to 35 wt %, freeze-drying was performed to obtain 14.9 g of the SBE-β-CD. The yield was 78%, and the average degree of substitution the SBE-β-CD was 6.7 as judged by capillary electrophoresis.

Embodiment 3: A method for preparing sulfobutyl ether-β-cyclodextrin (SBE-β-CD), characterized in that specific preparation steps are as follows.

Step (1): Synthesis reaction: the temperature was controlled at 20° C. to 30° C., a 2-methyltetrahydrofuran (2 ml) and a sodium hydroxide aqueous solution (3.7 N, 61.7 mmol) were added to a reaction flask, the temperature was increased to 60° C. to 70° C., a β-Cyclodextrin (10 g, 8.8 mmol) was added into the reaction flask, and 1,4-sulfobutyrolactone (19.2 g, 71 mmol) was dropped to the system at 70° C. to 75° C., the system was stirred at 70° C. to 75° C. after the dropping, and the pH value of the system was evidently reduced within 1 hour and was controlled at pH>9 by adding sodium hydroxide aqueous solution (3.7 N, 30.9 mmol in total). When the surplus of the β-cyclodextrin was less than 0.5% wt as judged by HPLC, the temperature was reduced to 20° C. to 25° C., then the system was regulated to pH=7.0 to 7.5 by adding a concentrated hydrochloric acid solution. The obtained reaction mixture was used directly in the next purification operation step.

Step (2): Purification process: the temperature was controlled at 20° C. to 30° C. The obtained reaction treatment solution was added into a dialysis bag, and ultrasonic dialysis was performed until it was detected that the content of chloride ions was less than 10 ppm. The obtained dialysate was treated with an active carbon (2 g) until the product solution was less than 0.5 AU by ultraviolet absorption (the operation was repeated once if the ultraviolet absorption was beyond this range). The active carbon was washed twice with 20 ml of deionized water, an operation of the next step was performed after a washing solution was combined with the filtrate. The combined filtrate was filtered through a 0.65 to 0.22 μm precise filter, then concentration was performed until it was detected that the content of the SBE-β-CD was 30 wt % to 35 wt %, freeze-drying was performed to obtain 14.3 g of the SBE-β-CD. The yield was 75%, and the average substitution degree of the SBE-β-CD was 6.7 as judged by capillary electrophoresis.

Embodiment 4

Processing of a β-Cyclodextrin: The β-Cyclodextrin with a Content of 99.8% was Crystallized Once in Hot Water at 90° C. to 100° C. to Obtain a β-Cyclodextrin Applied in the Present Embodiment.

Synthesis reaction: the temperature was controlled at 20° C. to 30° C., a 2-methyltetrahydrofuran (2 ml) and a sodium hydroxide aqueous solution (3.7 N, 61.7 mmol) were added to a reaction flask, the temperature was increased to 60° C. to 70° C., the β-cyclodextrin (10 g, 8.8 mmol) was added into the reaction flask, an 1,4-sulfobutyrolactone (19.2 g, 71 mmol) was dropped to the system at 70° C. to 75° C., the system was stirred at 70° C. to 75° C. after the dropping, the pH value of the system was evidently reduced within 1 hour and was controlled at pH>9 by adding sodium hydroxide aqueous solution (3.7 N, 30.9 mmol in total). When the surplus of the β-cyclodextrin was less than 0.5% wt as judged by HPLC, the temperature was reduced to 20° C. to 25° C., then the system was regulated to pH=7.0 to 7.5 by adding a concentrated hydrochloric acid solution having a concentration of 8.8 N, so as to obtain a product system.

Purification process: the temperature was controlled at 20° C. to 30° C. The obtained reaction treatment solution was added into a dialysis bag, and was stirred and dialyzed in deionized water until it was detected that the content of chloride ions was less than 10 ppm. The obtained dialysate was treated with an active carbon (2 g) until the product solution was less than 0.5 AU by ultraviolet absorption (the operation was repeated once if the ultraviolet absorption was beyond this range). The active carbon was washed twice with 20 ml of deionized water, an operation of the next step was performed after a washing solution was combined with a filtrate. The combined filtrate was filtered through a 0.65 to 0.22 μm precise filter, then concentration was performed until it was detected that the content of the SBE-β-CDn was 30 wt % to 35 wt %. freeze-drying was performed to obtain 13.7 g of the SBE-β-CD. The yield was 72%, and the average degree of substitution of the SBE-β-CD was 6.7 as judged by capillary electrophoresis.

Embodiment 5

Processing of a β-cyclodextrin: the β-cyclodextrin with a content of 98% was crystallized in hot water at 90° C. to 100° C. for three times to obtain a β-cyclodextrin applied in the present embodiment.

Synthesis reaction: the temperature was controlled at 20° C. to 30° C., a tetrahydrofuran (1 ml) and a sodium hydroxide aqueous solution (having a concentration of 3.7 N, and the mole number of sodium hydroxide used therein was 61.7 mmol in total) were added to a reaction flask so as to form a first mixed solution. The first mixed solution was heated to 60° C. to 70° C., then the β-cyclodextrin (10 g, 8.8 mmol) was added into the reaction flask to form a second mixed solution. The second mixed solution was heated to 70° C. to 75° C., then an 1,4-sulfobutyrolactone (19.2 g, 71 mmol) was dropped to the system to form a reaction system. The reaction system reacted while being stirred at 70° C. to 75° C., and the reaction system was controlled at 9<pH<10 by using a sodium hydroxide aqueous solution (having a concentration of 3.7 N, and the mole number of sodium hydroxide used therein was 30.9 mmol in total). When the surplus of the β-cyclodextrin was less than 0.5% wt as judged by HPLC, the temperature was reduced to 20° C. to 25° C., then the pH value of the system was regulated at 7.0 to 7.5 by using a concentrated hydrochloric acid solution having a concentration of 8.0 N, so as to obtain a product system.

Purification process: the temperature was controlled at 20° C. to 30° C. A solution of the product system was added into a dialysis bag having a molecular weight cut-off of 1000, and was subjected to ultrasonic dialysis in deionized water until it was detected that the content of chloride ions was less than 10 ppm, so as to obtain a first purified system. The obtained first purified system was filtered by an active carbon (1 g) to obtain a filtrate and an adsorbent active carbon. Some of the filtrate was freeze-dried to obtain a solid product. It was detected that ultraviolet absorption of the solid product was less than 0.5 AU. The adsorbent active carbon was washed twice with 15 ml of deionized water to obtain a washing solution. The washing solution was combined with the filtrate to obtain a second purified system. The second purified system was filtered by a precise filter having a filter element precision of 0.65 to 0.22 μm so as to obtain a third purified system. The third purified system was concentrated until it was detected that the content of the SBE-β-CD was 30 wt % to 35 wt %. freeze-drying was performed to obtain 14.9 g of the SBE-β-CD. The yield was 78%. The average degree of substitution of the SBE-β-CD was 6.7 as judged by capillary electrophoresis.

Embodiment 6

Processing of a β-cyclodextrin: the β-cyclodextrin with a content of 98% was crystallized in hot water at 90° C. to 100° C. for three times to obtain a β-cyclodextrin applied in the present embodiment.

Synthesis reaction: the temperature was controlled at 20° C. to 30° C., a tetrahydrofuran (1 ml) and a sodium hydroxide aqueous solution (having a concentration of 3.8 N, and the mole number of sodium hydroxide used therein was 67.3 mmol in total) were added to a reaction flask so as to form a first mixed solution. The first mixed solution was heated to 60° C. to 70° C., then the β-cyclodextrin (10 g, 8.8 mmol) was added into the reaction flask to form a second mixed solution. The second mixed solution was heated to 70° C. to 75° C., then an 1,4-sulfobutyrolactone (20.2 g, 74.8 mmol) was dropped to the system to form a reaction system. The reaction system reacted while being stirred at 70° C. to 75° C., and the reaction system was controlled at pH>9 by using a sodium hydroxide aqueous solution (having a concentration of 3.8 N, and the mole number of sodium hydroxide used therein was 33.0 mmol in total). When the surplus of the β-cyclodextrin was less than 0.5% wt as judged by HPLC, the temperature was reduced to 20° C. to 25° C., then the pH value of the system was regulated at 7.0 to 7.5 by using a concentrated hydrochloric acid having a concentration of 8.5 N, so as to obtain a product system.

Purification process: the temperature was controlled at 20° C. to 30° C. A solution of the product system was added into a dialysis bag having a molecular weight cut-off of 1000, and was subjected to ultrasonic dialysis in deionized water until it was detected that the content of chloride ions was less than 10 ppm, so as to obtain a first purified system. The obtained first purified system was filtered by an active carbon (1 g) to obtain a filtrate and an adsorbent active carbon. Some of the filtrate was freeze-dried to obtain a solid product. It was detected that ultraviolet absorption of the solid product was less than 0.5 AU, then the adsorbent active carbon was washed twice with 15 ml of deionized water to obtain a washing solution. The washing solution was combined with the filtrate to obtain a second purified system. The second purified system was filtered by a precise filter having a filter element precision of 0.65 to 0.22 µm so as to obtain a third purified system, the third purified system was concentrated until it was detected that the content of the SBE-β-CD was 30 wt % to 35 wt %, freeze-drying was performed to obtain 15.3 g of the SBE-β-CD. The yield was 80% The average degree of substitution of the SBE-β-CD was 6.9 as judged by capillary electrophoresis.

Embodiment 7

Processing of a β-cyclodextrin: the β-cyclodextrin with a content of 98% was crystallized in hot water at 90° C. to 100° C. for three times to obtain a β-cyclodextrin applied in the present embodiment.

Synthesis reaction: the temperature was controlled at 20° C. to 30° C., a tetrahydrofuran (1 ml) and a sodium hydroxide aqueous solution (having a concentration of 3.6 N, and the mole number of sodium hydroxide used therein was 57.4 mmol in total) were added to a reaction flask so as to form a first mixed solution; The first mixed solution was heated to 60° C. to 70° C., then the β-cyclodextrin (10 g, 8.8 mmol) was added into the reaction flask to form a second mixed solution; The second mixed solution was heated to 70° C. to 75° C., then an 1,4-sulfobutyrolactone (17.9 g, 66 mmol) was dropped to the system to form a reaction system, the reaction system reacted while being stirred at 70° C. to 75° C., and the reaction system was controlled at pH>9 with a sodium hydroxide aqueous solution (having a concentration of 4.2 N, and the mole number of sodium hydroxide used therein was 31 mmol in total). When the surplus of the β-cyclodextrin was less than 0.5% wt as judged by HPLC, the temperature was reduced to 20° C. to 25° C., then the pH value of the system was regulated at 7.0 to 7.5 by with a concentrated hydrochloric acid having a concentration of 8.8 N, so as to obtain a product system.

Purification process: the temperature was controlled at 20° C. to 30° C. A solution of the product system was added into a dialysis bag having a molecular weight cut-off of 1000, and was subjected to ultrasonic dialysis in deionized water until it was detected that the content of chloride ions was less than 10 ppm, so as to obtain a first purified system; The obtained first purified system was filtered by an active carbon (1 g) to obtain a filtrate and an adsorbent active carbon. Some of the filtrate was freeze-dried to obtain a solid product. It was detected that ultraviolet absorption of the solid product was less than 0.5 AU, then the adsorbent active carbon was washed twice with 15 ml of deionized water to obtain a washing solution, the washing solution was combined with the filtrate to obtain a second purified system; The second purified system was filtered by a precise filter having a filter element precision of 0.65 to 0.22 µm so as to obtain a third purified system. The third purified system was concentrated until it was detected that the content of the SBE-β-CD was 30 wt % to 35 wt %, freeze-drying was performed to obtain 14.7 g of the SBE-β-CD. The yield was 77%. The average degree of substitution of the SBE-β-CD was 6.5 as judged by capillary electrophoresis.

Embodiment 8

Processing of a β-cyclodextrin: the β-cyclodextrin with a content of 98% was crystallized in hot water at 90° C. to 100° C. for three times to obtain a β-cyclodextrin applied in the present embodiment Synthesis reaction: the temperature was controlled at 20° C. to 30° C., a tetrahydrofuran (1 ml) and a sodium hydroxide aqueous solution (having a concentration of 4.0 N, and the mole number of sodium hydroxide used therein was 53.5 mmol in total) were added to a reaction flask so as to form a first mixed solution; The first mixed solution was heated to 60° C. to 70° C., then the β-cyclodextrin (10 g, 8.8 mmol) was added into the reaction flask to form a second mixed solution; The second mixed solution was heated to 70° C. to 75° C., then an 1,4-sulfobutyrolactone (16.7 g, 61.6 mmol) was dropped to the system to form a reaction system, the reaction system reacted while being stirred at 70° C. to 75° C., and the reaction system was controlled at pH>9 with a sodium hydroxide aqueous solution (having a concentration of 3.7 N, and the mole number of sodium hydroxide used therein was 30 mmol in total). When the surplus of the β-cyclodextrin was less than 0.5% wt as judged by HPLC, the temperature was reduced to 20° C. to 25° C., then the pH value of the system was regulated at 7.0 to 7.5 by using a concentrated hydrochloric acid having a concentration of 8.8 N, so as to obtain a product system.

Purification process: the temperature was controlled at 20° C. to 30° C. A solution of the product system was added into a dialysis bag having a molecular weight cut-off of 1000, and was subjected to ultrasonic dialysis in deionized water until it was detected that the content of chloride ions was less than 10 ppm, so as to obtain a first purified system; The obtained first purified system was filtered by an active carbon (1 g) to obtain a filtrate and an adsorbent active carbon. Some of the filtrate was freeze-dried to obtain a solid product, it was detected that ultraviolet absorption of the solid product was less than 0.5 AU, then the adsorbent active carbon was washed twice with 15 ml of deionized water to obtain a washing solution, the washing solution was combined with the filtrate to obtain a second purified system; The second purified system was filtered by a precise filter having a filter element precision of 0.65 to 0.22 µm so as to obtain a third purified system. The third purified system was concentrated until it was detected that the content of the SBE-β-CD was 30 wt % to 35 wt %, freeze-drying was performed to obtain 14.9 g of the SBE-β-CD, the yield was 78%. The average degree of substitution of the SBE-β-CD was 6.3 as judged by capillary electrophoresis.

Embodiment 9

Processing of a β-cyclodextrin: the β-cyclodextrin with a content of 98% was crystallized in hot water at 90° C. to 100° C. for three times to obtain a β-cyclodextrin applied in the present embodiment.

Synthesis reaction: the temperature was controlled at 20° C. to 30° C., a tetrahydrofuran (0.2 ml) and a sodium hydroxide aqueous solution (having a concentration of 3.7 N, and the mole number of sodium hydroxide used therein was 61.7 mmol in total) were added to a reaction flask so as to form a first mixed solution; The first mixed solution was heated to 60° C. to 70° C., then the β-cyclodextrin (10 g, 8.8 mmol) was added into the reaction flask to form a second mixed solution; The second mixed solution was heated to 70° C. to 75° C., then an 1,4-sulfobutyrolactone (9.6 g, 71 mmol) was dropped to the system to form a reaction system, the reaction system reacted while being stirred at 70° C. to 75° C., and the reaction system was controlled at 9<pH<10 by using a sodium hydroxide aqueous solution (having a concentration of 3.7 N, and the mole number of sodium hydroxide used therein was 30.9 mmol in total). When the surplus of the β-cyclodextrin was less than 0.5% wt as judged by HPLC, the temperature was reduced to 20° C. to 25° C., then the pH value of the system was regulated at 7.0 to 7.5 by using a concentrated hydrochloric acid having a concentration of 8.0 N, so as to obtain a product system.

Purification process: the temperature was controlled at 20° C. to 30° C. A solution of the product system was added into a dialysis bag having a molecular weight cut-off of 1000, and was subjected to ultrasonic dialysis in deionized water until it was detected that the content of chloride ions was less than 10 ppm, so as to obtain a first purified system; The obtained first purified system was filtered by active carbon (1 g) to obtain a filtrate and an adsorbent active carbon, some of the filtrate was freeze-dried to obtain a solid product, it was detected that ultraviolet absorption of the solid product was less than 0.5 AU, then the adsorbent active carbon was washed twice with 15 ml of deionized water to obtain a washing solution, the washing solution was combined with the filtrate to obtain a second purified system; The second purified system was filtered by a precise filter having a filter element precision of 0.65 to 0.22 μm so as to obtain a third purified system. The third purified system was concentrated until it was detected that the content of the SBE-β-CD was 30 wt % to 35 wt %, freeze-drying was performed to obtain 14.5 g of the SBE-β-CD, the yield was 76%. The average degree of substitution of the SBE-β-CD was 6.7 as judged by capillary electrophoresis.

Embodiment 10

Processing of a β-cyclodextrin: The β-cyclodextrin with a content of 98% was crystallized in hot water at 90° C. to 100° C. for three times to obtain a β-cyclodextrin applied in the present embodiment Synthesis reaction: the temperature was controlled at 20° C. to 30° C., a tetrahydrofuran (2 ml) and a sodium hydroxide aqueous solution (having a concentration of 3.7 N, and the mole number of sodium hydroxide used therein was 61.7 mmol in total) were added to a reaction flask so as to form a first mixed solution; The first mixed solution was heated to 60° C. to 70° C., then the β-cyclodextrin (10 g, 8.8 mmol) was added into the reaction flask to form a second mixed solution; The second mixed solution was heated to 70° C. to 75° C., then an 1,4-sulfobutyrolactone (9.6 g, 71 mmol) was dropped to the system to form a reaction system, the reaction system reacted while being stirred at 70° C. to 75° C., and the reaction system was controlled at 9<pH<10 by using a sodium hydroxide aqueous solution (having a concentration of 3.7 N, and the mole number of sodium hydroxide used therein was 30.9 mmol in total). When the surplus of the β-cyclodextrin was less than 0.5% wt as judged by HPLC, the temperature was reduced to 20° C. to 25° C., then the pH value of the system was regulated at 7.0 to 7.5 by using a concentrated hydrochloric acid having a concentration of 8.0 N, so as to obtain a product system.

Purification process: the temperature was controlled at 20° C. to 30° C. A solution of the product system was added into a dialysis bag having a molecular weight cut-off of 1000, and was subjected to ultrasonic dialysis in deionized water until it was detected that the content of chloride ions was less than 10 ppm, so as to obtain a first purified system; The obtained first purified system was filtered by an active carbon (1 g) to obtain a filtrate and an adsorbent active carbon. Some of the filtrate was freeze-dried to obtain a solid product, it was detected that ultraviolet absorption of the solid product was less than 0.5 AU, then the adsorbent active carbon was washed twice with 15 ml of deionized water to obtain a washing solution, the washing solution was combined with the filtrate to obtain a second purified system; The second purified system was filtered by a precise filter having a filter element precision of 0.65 to 0.22 μm so as to obtain a third purified system. The third purified system was concentrated until it was detected that the content of the SBE-β-CD was 30 wt % to 35 wt %, freeze-drying was performed to obtain 15.5 g of the SBE-β-CD, the yield was 81%. The average degree of substitution of the SBE-β-CD was 6.7 as judged by capillary electrophoresis.

Embodiment 11

Processing of a β-cyclodextrin: the β-cyclodextrin with a content of 98% was crystallized in hot water at 90° C. to 100° C. for three times to obtain a β-cyclodextrin applied in the present embodiment.

Synthesis reaction: the temperature was controlled at 20° C. to 30° C., a tetrahydrofuran (1 ml) and a sodium hydroxide aqueous solution (having a concentration of 3.7 N, and the mole number of sodium hydroxide used therein was 61.7 mmol in total) were added to a reaction flask so as to form a first mixed solution; The first mixed solution was heated to 60° C. to 70° C., then the β-cyclodextrin (10 g, 8.8 mmol) was added into the reaction flask to form a second mixed solution; The second mixed solution was heated to 70° C. to 75° C., then an 1,4-sulfobutyrolactone (9.6 g, 71 mmol) was dropped to the system to form a reaction system, the reaction system reacted while being stirred at 70° C. to 75° C., and the reaction system was controlled at 9<pH<10 by using a sodium hydroxide aqueous solution (having a concentration of 3.7 N, and the mole number of sodium hydroxide used therein was 30.9 mmol in total). When the surplus of the β-cyclodextrin was less than 0.5% wt as judged by HPLC, the temperature was reduced to 20° C. to 25° C., then the pH value of the system was regulated at 7.0 to 7.5 by using a concentrated hydrochloric acid having a concentration of 8.0 N, so as to obtain a product system.

Purification process: the temperature was controlled at 20° C. to 30° C. A solution of the product system was added into a dialysis bag having a molecular weight cut-off of 1000, and was subjected to ultrasonic dialysis in deionized water until it was detected that the content of chloride ions was less than 10 ppm, so as to obtain a first purified system; The obtained first purified system was filtered by an active carbon (2.5 g) to obtain a filtrate and adsorbent active carbon. Some of the filtrate was freeze-dried to obtain a solid product, it was detected that ultraviolet absorption of the solid product was less than 0.5 AU, then the adsorbent active carbon was washed twice with 20 ml of deionized water to obtain a washing solution, the washing solution was combined with the filtrate to obtain a second purified system; The second purified system was filtered by a precise filter having a filter element precision of 0.65 to 0.22 μm so as to obtain a third purified system. The third purified system was concentrated until it was detected that the content of the SBE-β-CD was 30 wt % to 35 wt %, freeze-drying was performed to obtain 14.1 g of the SBE-β-CD, the yield was 74%. The average degree of substitution of the SBE-β-CD was 6.7 as judged by capillary electrophoresis.

Embodiment 12

Processing of a β-cyclodextrin: the β-cyclodextrin with a content of 98% was crystallized in hot water at 90° C. to 100° C. for three times to obtain a β-cyclodextrin applied in the present embodiment.

Synthesis reaction: the temperature was controlled at 20° C. to 30° C., a tetrahydrofuran (2.5 ml) and a sodium hydroxide aqueous solution (having a concentration of 3.7 N, and the mole number of sodium hydroxide used therein was 61.7 mmol in total) were added to a reaction flask so as to form a first mixed solution; The first mixed solution was heated to 60° C. to 70° C., then the β-cyclodextrin (10 g, 8.8 mmol) was added into the reaction flask to form a second mixed solution; The second mixed solution was heated to 70° C. to 75° C., then an 1,4-sulfobutyrolactone (9.6 g, 71 mmol) was dropped to the system to form a reaction system, the reaction system reacted while being stirred at 70° C. to 75° C., and the reaction system was controlled at 9<pH<10 by using a sodium hydroxide aqueous solution (having a concentration of 3.7 N, and the mole number of sodium hydroxide used therein was 30.9 mmol in total). When the surplus of the β-cyclodextrin was less than 0.5% wt as judged by HPLC, the temperature was reduced to 20° C. to 25° C., then the pH value of the system was regulated at 7.0 to 7.5 by using a concentrated hydrochloric acid having a concentration of 8.0 N, so as to obtain a product system.

Purification process: the temperature was controlled at 20° C. to 30° C. A solution of the product system was added into a dialysis bag having a molecular weight cut-off of 1000, and was subjected to ultrasonic dialysis in deionized water until it was detected that the content of chloride ions was less than 10 ppm, so as to obtain a first purified system; The obtained first purified system was filtered by an active carbon (1 g) to obtain a filtrate and an adsorbent active carbon. Some of the filtrate was freeze-dried to obtain a solid product, it was detected that ultraviolet absorption of the solid product was less than 0.5 AU, then the adsorbent active carbon was washed twice with 15 ml of deionized water to obtain a washing solution, the washing solution was combined with the filtrate to obtain a second purified system; The second purified system was filtered by a precise filter having a filter element precision of 0.65 to 0.22 μm so as to obtain a third purified system. The third purified system was concentrated until it was detected that the content of the SBE-β-CD was 30 wt % to 35 wt %, freeze-drying was performed to obtain 14.5 g of the SBE-β-CD, the yield was 76%. The average degree of substitution of the SBE-β-CD was 6.7 as judged by capillary electrophoresis.

Embodiment 13

Processing of a β-cyclodextrin: the β-cyclodextrin with a content of 98% was crystallized in hot water at 90° C. to 100° C. for three times to obtain a β-cyclodextrin applied in the present embodiment.

Synthesis reaction: the temperature was controlled at 20° C. to 30° C., a tetrahydrofuran (1 ml) and a sodium hydroxide aqueous solution (having a concentration of 3.7 N, and the mole number of sodium hydroxide used therein was 61.7 mmol in total) are added to a reaction flask so as to form a first mixed solution; The first mixed solution was heated to 60° C. to 70° C., then the β-cyclodextrin (10 g, 8.8 mmol) was added into the reaction flask to form a second mixed solution; The second mixed solution was heated to 70° C. to 75° C., then an 1,4-sulfobutyrolactone (7.7 g, 57 mmol) was dropped to the system to form a reaction system, the reaction system reacted while being stirred at 70° C. to 75° C., and the reaction system was controlled at 9<pH<10 by using a sodium hydroxide aqueous solution (having a concentration of 3.7 N, and the mole number of sodium hydroxide used therein was 26.4 mmol in total). When the surplus of the β-cyclodextrin was less than 0.5% wt as judged by HPLC, the temperature was reduced to 20° C. to 25° C., then the pH value of the system was regulated at 7.0 to 7.5 by using a concentrated hydrochloric acid having a concentration of 8.0 N, so as to obtain a product system.

Purification process: the temperature was controlled at 20° C. to 30° C. A solution of the product system was added into a dialysis bag having a molecular weight cut-off of 1000, and was subjected to ultrasonic dialysis in deionized water until it was detected that the content of chloride ions was less than 10 ppm, so as to obtain a first purified system; The obtained first purified system was filtered by an active carbon (1 g) to obtain a filtrate and an adsorbent active carbon. Some of the filtrate was freeze-dried to obtain a solid product, it was detected that ultraviolet absorption of the solid product was less than 0.5 AU, then the adsorbent active carbon was washed twice with 15 ml of deionized water to obtain a washing solution, the washing solution was combined with the filtrate to obtain a second purified system; The second purified system was filtered by a precise filter having a filter element precision of 0.65 to 0.22 μm so as to obtain a third purified system. The third purified system was concentrated until it was detected that the content of the SBE-β-CD was 30 wt % to 35 wt %, freeze-drying was performed to obtain 14.9 g of the SBE-β-CD, the yield was 78%. The average degree of substitution of the SBE-β-CD was 6.7 as judged by capillary electrophoresis.

The average degree of substitution of the SBE-β-CD obtained in the embodiments above can satisfy pharmacopeial requirements, and the yields of the SBE-β-CD may be adjusted by adjusting the use amounts of the organic solvent and the sodium hydroxide. In the meanwhile, the method is easy to operate and has mild reaction conditions, and is applicable to mass industrial application.

Thus it can be seen that the method for synthesizing SBE-β-CD, which is disclosed by the present disclosure, uses the β-cyclodextrin and the 1,4-sulfobutyrolactone as raw materials, and introduces a proper amount of the organic solvent into the alkaline aqueous solution, so that the solubility of the 1,4-sulfobutyrolactone is increased, and the synthesis yield of the SBE-β-CD is improved. Operations including ultrasonic dialysis, active carbon decolourization, freeze-drying and so on are performed on an obtained product solution, so as to obtain a powder product of the SBE-β-CD. The present disclosure represents a stable process with moderate reaction condition, is easy to operate, and provides product in relatively high yield, thereby providing a new idea and method for mass production of sulfobutyl ether-β-cyclodextrin (SBE-β-CD).

The above examples are only preferred embodiments of the present disclosure, but are not used for limiting the present disclosure. For those skilled in the art, the present disclosure may have various modifications and changes. Any modifications, equivalent replacements, improvements and the like made within the spirit and principles of the present disclosure shall be included in the scope of protection of the present disclosure.

What is claimed is:

1. A method for preparing sulfobutyl ether-β-cyclodextrin, the method consisting of specific preparation steps are as follows:

Step (1): synthesis reaction: controlling the temperature at 20° C. to 30° C., adding an ether solvent and a sodium hydroxide aqueous solution having a concentration of 3.7 N into a reaction flask, increasing the temperature to 60° C. to 70° C., adding a β-cyclodextrin into the reaction flask; dropping an 1,4-sulfobutyrolactone to the reaction solution at 70° C. to 75° C., stirring the reaction solution at 70° C. to 75° C. after the dropping, controlling the reaction solution at pH>9 by adding a second sodium hydroxide aqueous solution having a concentration of 3.7 N, reducing the temperature to 20° C. to 25° C. when the percentage of unreacted β-cyclodextrin accounts for less than 0.5% wt of the total input of the β-cyclodextrin as measured by High Performance Liquid Chromatography, then adjusting the reaction solution to pH=7.0 to 7.5 with a concentrated hydrochloric acid, and providing an obtained mixed reaction solution in a purification operation in the next step directly;

Step (2): purification: controlling the temperature at 20° C. to 30° C., adding the mixed reaction solution obtained in Step (1) into a dialysis bag, performing ultrasonic dialysis until the content of chloride ions is less than 10 ppm, decolorizing the dialysate by an absorbent active carbon, followed by filtrating to obtain a filtrate having ultraviolet absorption less than 0.5 AU, washing the active carbon twice by deionized water of 1 to 2 ml/g of the total input of the β-cyclodextrin, combining wash solution with the filtrate, concentrating the combined wash solution and filtrate by a 0.65 to 0.22 μm filter until the percentage of the sulfobutyl ether-β-cyclodextrin accounts for 30 wt % to 35 wt % of the total amount of the final solution, performing freeze-drying to obtain the sulfobutyl ether-β-cyclodextrin, and measuring an average 6.7 degree of substitution of the sulfobutyl ether group in capillary electrophoresis the amount of the ether solvent is 0.02 to 0.20 ml/g of the β-cyclodextrin.

2. The method for preparing sulfobutyl ether-β-cyclodextrin according to claim 1, wherein the β-cyclodextrin in Step (1) is prepared by crystallizing a commercial β-cyclodextrin in hot water at 90° C. to 100° C. for 2 to 3 times.

3. The method for preparing sulfobutyl ether-β-cyclodextrin according to claim 1, wherein the ether solvent in Step (1) is at least one of a tetrahydrofuran, an 1,4-dioxane or a 2-methyltetrahydrofuran.

4. The method for preparing sulfobutyl ether-β-cyclodextrin according to claim 1, wherein in Step (1), the molar equivalent ratio of the first sodium hydroxide to the β-cyclodextrin is 7.0 s, the molar equivalent ratio of the 1,4-sulfobutyrolactone to the β-cyclodextrin is 8.0, and the molar equivalent ratio of the second sodium hydroxide to the β-cyclodextrin is 3.5.

5. The method for preparing sulfobutyl ether-β-cyclodextrin according to claim 1, wherein in Step (2), the molecular weight cut-off of the dialysis bag is 1000, the amount of the active carbon is 0.05 to 0.2 g/g of the β-cyclodextrin, and the amount of the deionized water for washing the active carbon is 1 to 2 ml/g of the β-cyclodextrin.

6. The method for preparing sulfobutyl ether-β-cyclodextrin according to claim 1, wherein in Step (2), decolorizing the filtrate repeatedly if the ultraviolet absorption value of the filtrate is larger than or equal to 0.5 AU.

7. A method for preparing sulfobutyl ether-β-cyclodextrin, wherein the method consists of:
mixing an ether solvent with a first sodium hydroxide aqueous solution to form a first mixed solution;
heating the first mixed solution to 60° C. to 70° C. and then mixing with a β-cyclodextrin to form a second mixed solution;
heating the second mixed solution to 70° C. to 75° C. and then mixing with an 1,4-sulfobutyrolactone to form a reaction system;
stirring the reaction system at 70° C. to 75° C. and controlling the pH of the reaction system to larger than 9by adding a second sodium hydroxide aqueous solution, cooling the reaction system to 20° C. to 25° C. when the percentage of the unreacted β-cyclodextrin accounts for less than 0.5% wt of the input of the β-cyclodextrin, then adjusting the pH value of the reaction system at 7.0 to 7.5 with a concentrated hydrochloric acid to obtain a product system containing the sulfobutyl ether-β-cyclodextrin, and purifying the product system to obtain the sulfobutyl ether-β-cyclodextrin,
the amount of the ether solvent is 0.02 to 0.20 ml/g of the β-cyclodextrin.

8. The method according to claim 7, wherein the concentration of the first sodium hydroxide aqueous solution is 3.7 N; and the second sodium hydroxide aqueous solution has a concentration of 3.7 N.

9. The method according to claim 8, wherein the molar equivalent ratio of the first sodium hydroxide to the β-cyclodextrin is 6.0 to 8.0; the molar equivalent ratio of the 1,4-sulfobutyrolactone to the β-cyclodextrin is 7.0 to 9.0; the molar equivalent ratio of the second sodium hydroxide to the β-cyclodextrin is 3.0 to 4.0.

10. The method according to claim 7, wherein the β-cyclodextrin is prepared by crystallizing a commercial β-cyclodextrin in hot water at 90° C. to 100° C. for 1 to 3 times.

11. The method according to claim 7, wherein the ether solvent is one or more ether selected from the group consisting of a tetrahydrofuran, an 1,4-dioxane or a 2-methyltetrahydrofuran.

12. The method according to claim 7, wherein the step of purifying the product system comprises:
subjecting the product system to dialysis at 20° C. to 30° C. until the content of chloride ions in the product system is less than 10 ppm, to obtaining a first purified system;
decolorizing the first purified system with an active carbon, to obtain a second purified system;
filtering and concentrating the second purified system until the content of the sulfobutyl ether-β-cyclodextrin accounts for 30 wt % to 35 wt % of the total weight of the second purified system, to obtain a third purified system; and
freeze-drying the third purified system, to obtain the sulfobutyl ether-β-cyclodextrin.

13. The method according to claim 12, wherein the dialysis is performed in a dialysis bag having a molecular weight cut-off of 1000.

14. The method according to claim 12, wherein the step of decolorizing the first purified system with the active carbon comprises:
mixing the active carbon with the first purified system and then filtering, to obtain active carbon absorption and a filtrate;
washing the active carbon absorption, to obtain a wash solution;
mixing the washing solution with the filtrate, to obtain the second purified system.

15. The method according to claim 14, the amount of the active carbon is 0.05 to 0.2 g/g of the β-cyclodextrin; the amount of the deionized water for washing the active carbon absorption is 1 to 2 ml/g of the β-cyclodextrin.

16. The method according to claim 14, wherein the step of decolorizing the first purified system with the active carbon is performed repeatedly until ultraviolet absorption of the filtrate is less than 0.5 AU.

17. The method according to claim 12, wherein a filter element with precision of 0.65 to 0.22 μm is used to filter and concentrate the second purified system.

* * * * *